United States Patent [19]

Swart

[11] Patent Number: 4,613,678

[45] Date of Patent: Sep. 23, 1986

[54] ESTERIFICATION OF AROMATIC DICARBOXYLIC ACIDS WITH CYCLIC ALKYLENE CARBONATES

[75] Inventor: Daniel J. Swart, Midland, Mich.

[73] Assignee: The Dow Chemical Company, Midland, Mich.

[21] Appl. No.: 164,745

[22] Filed: Jun. 30, 1980

Related U.S. Application Data

[63] Continuation-in-part of Ser. No. 112,007, Jan. 14, 1980, abandoned, which is a continuation-in-part of Ser. No. 35,171, May 2, 1979, abandoned.

[51] Int. Cl.$^4$ ............... C07C 67/03; C07C 69/80; C07C 69/82; C07C 69/88
[52] U.S. Cl. ............... 560/92; 528/308; 528/308.8; 560/64; 560/67; 560/71; 560/72; 560/79; 560/80; 560/85; 560/89
[58] Field of Search ............... 560/64, 67, 71, 92, 560/89, 204, 234, 72, 80, 85, 79

[56] References Cited

U.S. PATENT DOCUMENTS

| | | | |
|---|---|---|---|
| 2,970,986 | 2/1961 | Woodward | 560/92 |
| 3,056,827 | 10/1962 | Windholz | 560/92 |
| 3,215,731 | 11/1965 | Bearden et al. | 560/224 |
| 3,549,692 | 12/1970 | Bockmann et al. | 560/92 |
| 3,832,375 | 8/1974 | Itoh | 560/263 |
| 3,842,040 | 10/1974 | Browne et al. | 560/92 |

OTHER PUBLICATIONS

Chem. & Engineering News, Jul. 18, 1977, p. 31.
Schering AG, Dept. of Pharmaceutical Fine Chemicals, DMAP Its Reactions and Uses, Jan. 1977.

*Primary Examiner*—Vivian Garner
*Attorney, Agent, or Firm*—Douglas N. Deline

[57] ABSTRACT

Esterification of aromatic dicarboxylic acids with cyclic alkylene carbonates in the presence of organic compounds containing at least one six-membered aromatic nitrogen-containing heterocyclic moiety.

11 Claims, No Drawings

ESTERIFICATION OF AROMATIC DICARBOXYLIC ACIDS WITH CYCLIC ALKYLENE CARBONATES

CROSS-REFERENCE TO RELATED APPLICATION

This is a continuation-in-part of my copending application Ser. No. 112,007, filed Jan. 14, 1980, abandoned which is a continuation-in-part of my copending application Ser. No. 035,171, filed May 2, 1979, abandoned.

BACKGROUND OF THE INVENTION

The invention relates to improvements in the process of producing esterification products of aromatic dicarboxylic acids. It is known to react cyclic alkylene carbonates with aromatic dicarboxylic acids to produce bis-hydroxy-substituted esters of aromatic dicarboxylic acids as well as oligomers and polymers thereof.

U.S. Pat. No. 3,549,692 teaches the use of certain five-membered N-heterocyclic compounds containing 2 to 4 heterocyclic nitrogen atoms as catalysts in the aforementioned reaction. Also disclosed by this patent are known catalysts of the prior art including alkali metal carbonates, antimony trioxide, cerium dioxide, zinc borate, magnesium acetate and lead acetate. Other catalysts for the process are also known.

The catalysts hitherto used for accelerating the reaction have proven to be unacceptable either because of an inability to operate effectively at desired low reaction temperature, expense, subsequent contamination of resulting products, or poor selectivity in product formation.

SUMMARY OF THE INVENTION

According to the present invention organic compounds containing at least one six-membered aromatic nitrogen-containing heterocyclic moiety are used as catalysts for the reaction of aromatic dicarboxylic acids with cyclic alkylene carbonates.

I have found that these compounds are effective catalysts in this reaction and that, surprisingly, use of these catalysts provides an improved ability to produce aromatic dicarboxylic bis(2-hydroxyalkyl)esters without concomitant formation of higher oligomers as unavoidably occurs when other known catalysts are employed. For the first time an economical process is disclosed employing the reaction of an aromatic dicarboxylic acid with a cyclic alkylene carbonate whereby bis(2-hydroxyalkyl)esters of aromatic dicarboxylic acids in high yield and purity may be produced and isolated.

The bis(2-hydroxyalkyl)esters of aromatic dicarboxylic acids produced according to this process have utility in the production of polyesters and in other industrial applications. I have also found that the catalysts of this invention are also advantageously employed in a two-step process for making high molecular weight linear polyester resins suitable for fiber-forming and molding applications. Accordingly, monomeric and oligomeric esters are first produced employing the catalysts of the instant invention. The monomeric and oligomeric esters are then polycondensed according to well-known reaction conditions to produce the high molecular weight polyester resin products.

Additionally, the present catalysts provide the operator with the ability to employ known methods by which to purify the aromatic dicarboxylic bis(2-hydroxyalkyl)esters formed prior to their polycondensation or polymerization. It is thereby possible to avoid costly preliminary purification of the aromatic dicarboxylic acid and instead employ a relatively cheaper and more readily available crude grade of aromatic dicarboxylic acid containing small amounts of various impurities and color bodies. Purification of the aromatic dicarboxylic bis(2-hydroxyalkyl)ester formed is comparatively easy relative to the known difficulties in purification of terephthalic acid which because of its refractory nature and slight solubility in almost any convenient solvent is only purified with great difficulty and expense.

DETAILED DESCRIPTION OF THE INVENTION

The catalysts for use according to the instant invention are characterized by at least one six-membered aromatic nitrogen-containing heterocyclic moiety. More particularly the catalysts are compounds selected from the group consisting of

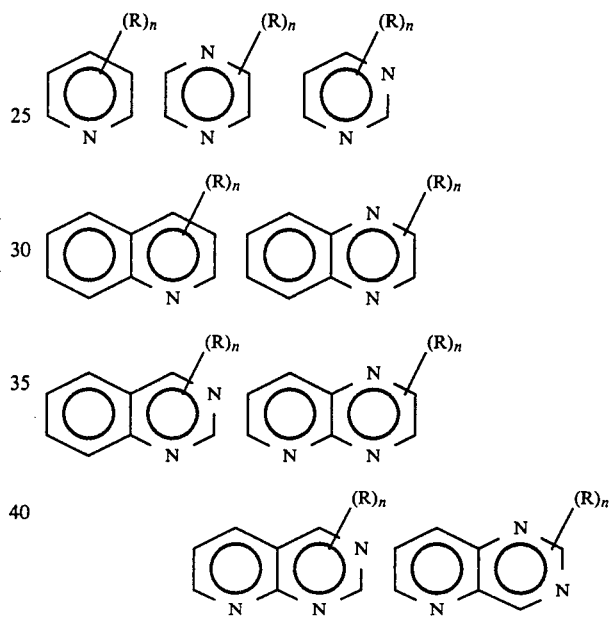

wherein R is amino, phenyl, or a radical containing up to 4 carbons selected from alkyl, alkylamino, dialkylamino and oxyalkyl; and n is zero, one or two.

Preferred catalysts are pyridine and pyridine further substituted with one or two substituents selected from amino, phenyl, and a radical containing up to 4 carbons selected from alkyl, alkylamino, dialkylamino, and oxyalkyl.

The catalysts may be used in each case by themselves, but also in admixture with one another.

The catalysts of the invention may be employed in catalytically effective concentrations ranging, for example, from about 0.01 to about 5 percent by weight based on the amount of aromatic dicarboxylic acid reactant used. A preferred concentration is from about 0.05 to about 2 percent.

Suitable aromatic dicarboxylic acids with which the cyclic alkylene carbonates can be reacted are, for example, terephthalic acid, phthalic acid, isophthalic acid, naphthalene-dicarboxylic acids, such as -1,8, -1,4, -1,2, hydroxyphenyl-dicarboxylic acids, such as 2-hydroxy-terephthalic acid, 5-hydroxy-isophthalic acid, 4-hydroxy-phthalic acid, and alkyl-phenyl-dicarboxylic acids, such as 2-methyl-terephthalic acid, 3-methylphthalic acid, tetramethyl-phthalic acid, 5-isobutylisophthalic acid, diphenyl dicarboxylic acids, such as diphenyl-4,4'-dicarboxylic acid, α,ω-diphenylalkane dicarboxylic acids, such as 1,2-diphenylethyl-4,4'-dicarboxylic acid, and α,ω-diphenoxyalkane dicarboxylic acids, such as 1,2-diphenoxyethyl-4,4'-dicarboxylic acid. The preferred acid is terephthalic acid.

Cyclic alkylene carbonates which are suitable for the reaction with the aromatic dicarboxylic acids include ethylene carbonate, 1,2-propylene carbonate, 1,3-propylene carbonate, 1,2-butylene carbonate, 2,3-butylene carbonate, phenylethylene carbonate, etc.

The aromatic dicarboxylic acid is expediently reacted with the cyclic alkylene carbonate at temperatures between 145° C. and 200° C., preferably between 160° C. and 175° C., in the presence of the above catalysts, to give primarily aromatic dicarboxylic acid-bis(2-hydroxyalkyl)esters.

The molar ratio of total dicarboxylic acid to total cyclic alkylene carbonate may range from about 1:2 to about 1:20. Preferred is a ratio of from about 1:2 to about 1:4 in order to maximize selective production of bis(2-hydroxyalkyl)ester products substantially free of higher oligomer formation, but to minimize unreacted cyclic alkylene carbonate contamination of the resulting products.

In the practice of this invention it is preferred to combine a mixture of aromatic dicarboxylic acid, cyclic alkylene carbonate and catalyst in a suitably designed reaction flask, capable of withstanding the reaction conditions employed. The mixture is heated with stirring to the desired reaction temperatures until the aromatic dicarboxylic acid is substantially dissolved and carbon dioxide evolution is substantially complete. Depending on the reactants, catalyst and conditions employed, reaction times from about 15 minutes to about 2 hours or longer may be required.

When the catalyst employed has a lower boiling point than the temperature at which the reaction is conducted, it is advantageous, at least initially, to employ a suitable means of maintaining the catalyst in intimate contact with the reactants. A preferred means is the use of superatmospheric pressure, for example, pressures from atmospheric to about 5 atmospheres. Alternatively, one may employ a condenser capable of condensing the volatilized catalyst and returning it to the reaction mixture. The latter method advantageously additionally permits the catalyst to be recycled and reused and provides a product containing low residual amounts of catalyst contamination.

The reaction products are obtained by cooling to a temperature less than about 130° C. preferably while protected by an inert gas, for example, nitrogen. Cooling sufficiently soon after substantial completion of the reaction so as to avoid formation of substantial amounts of higher oligomers of bis(2-hydroxyalkyl)ester is preferred, particularly when operating with reactant ratios of dicarboxylic acid to alkylene carbonate approaching 1:2.

The bis(2-hydroxyalkyl)ester is next separated and purified if necessary. One method of product separation and recovery is by solvent extraction with an inert organic solvent followed by washing with an alkali hydroxide solution and a water rinse. Suitable extraction solvents include ethyl acetate, 1,2-dichloroethane, chloroform, etc. A preferred solvent is ethyl acetate. Water is then removed from the organic solvent extract and the product recovered, as for example by solvent evaporation.

Additional methods of recovering dicarboxylic bis(2-hydroxyalkyl)ester include techniques of zone refining, sublimation or other methods well-known to one skilled in the art.

As previously mentioned, the high selectivity in bis(2-hydroxyalkyl)ester formation when utilizing the catalysts of the instant invention advantageously permits the use of a grade of dicarboxylic acid that is not highly purified by including in the instant process an optional purification step after formation of the bis(2-hydroxyalkyl)ester. Examples of such purification techniques in the production of bis-hydroxyethyl terephthalate are well-known.

Terephthalic acid is generally available in several grades. Crude terephthalic acid as used herein will be understood to meet a specification of at least 95 percent purity but less than 99 percent by gravimetric determination. Commercially available grades of terephthalic acid such as TA-12 or TA-22 sold by Amoco Chemicals Corporation meeting a minimum specification of 98.5 percent terephthalic acid are considered to be crude terephthalic acid for purposes of this invention. The impurities normally present in crude terephthalic acid include reaction by-products such as 4-carboxybenzaldehyde, p-toluic acid, unreacted p-xylene and color bodies such as ash and ionic compounds which ultimately harm polymer clarity and color. These impurities and color bodies as well as their further derivatives formed by the esterification reaction are also present in the bis(2-hydroxyalkyl)ester reaction product. Further oligomeric reaction products of the bis(2-hydroxyalkyl)ester, which may render the handling and purification of the bis(2-hydroxyalkyl)ester more difficult, are not considered to be impurities or color bodies for purposes of the present invention.

Utilizing such a crude grade of terephthalic acid, impure bis(2-hydroxyethyl)terephthalate plus a small and controllable amount of oligomers thereof are produced by the instant process. After discontinuation of the esterification reaction, the reaction products may be treated in any of a number of purification processes. For example, one such method involves dissolving the impure bis(2-hydroxyethyl)terephthalate in a hot solvent such as ethylene dichloride, s-tetrachloroethane, 1,2-propylene dichloride, etc. and filtering prior to recrystallization. The method has been disclosed in U.S. Pat. No. 3,120,560 for which teaching it is herein incorporated by reference.

Another purification method involves contacting an aqueous solution of the bis(2-hydroxyethyl)terephthalate which also contains hypophosphorous or orthophosphorous acid at a pH of less than 7 with a metal catalyst that is a member of Group VIII of the Periodic Table. The process has been disclosed in U.S. Pat. No. 3,639,450 for which teaching it is herein incorporated by reference.

A further purification process involves contacting an aqueous solution of bis(2-hydroxyethyl)terephthalate with an alkali metal sulfite or bisulfite, ammonium sulfite or bisulfite or sodium hyposulfite. These processes are disclosed in U.S. Pat. No. 3,639,450 and Great Britain Patent Specification No. 760,027, respectively, for which teaching they are herein incorporated by reference.

A rapid distillation process comprising distilling crude bis(2-hydroxyethyl)terephthalate at a temperature of from 200° C. to 350° C. under a vacuum has been used to remove high boiling impurities. This process was disclosed in U.S. Pat. No. 3,803,003 for which teaching it is herein incorporated by reference.

It is also well-known that charcoal, activated carbon or other highly absorbant agent may be employed according to well-known techniques to remove impurities from the crude bis(2-hydroxyethyl)terephthalate.

All of the previously described purification processes are suitable for use according to the instant invention.

It is also understood that this invention is capable of use in a continuous process, that is a process wherein reactants are continuously added or recycled and the product dicarboxylic bis(2-hydroxyalkyl)ester and by-products are continuously removed.

The dicarboxylic bis(2-hydroxyalkyl)ester produced according to this invention may be used in the formation of linear high molecular weight polyesters and in other important industrial applications.

SPECIFIC EMBODIMENTS

The following examples illustrate the process according to the invention:

EXAMPLE 1—Bis(2-hydroxyethyl)terephthalate

A round botton glass flask equipped with mechanical stirrer was charged with terephthalic acid (16.61 g, 0.1 mole), ethylene carbonate (35.24 g, 0.4 mole) and 0.2222 g of 4-(N,N-dimethylamino)pyridine (1.34 percent). The mixture was purged with dry nitrogen for 30 minutes and then heated in an oil bath to 160° C. When the ethylene carbonate melted, rapid stirring was commenced and was maintained until a clear solution resulted and carbon dioxide evolution subsided (about 55 minutes). The flask was removed from the oil bath and cooled to room temperature under a nitrogen blanket. A white crystalline solid remained.

A portion (37.9 g) of the product mixture was pulverized and stirred in about 500 ml of hot ethyl acetate. Undissolved material was removed by filtration and the hot filtrate was washed with 0.1 M aqueous KOH and then with water. The organic solution was dried by passing through MgSO4, filtered, and the solvent removed by a rotary evaporator. A white crystalline solid (13.94 g, 62 percent yield) having a melting point of 100° C.–106° C. was recovered. Recrystallization from ethyl acetate yielded white needles having a melting point of 109.5° C.–111° C. The structure of bis(2-hydroxyethyl)terephthalate was confirmed by nuclear magnetic resonance spectroscopy and liquid chromatographic analysis.

EXAMPLE 2

The reaction conditions of Example 1 were repeated at an elevated bath temperature of 175° C. The product distribution obtained was identical to that obtained in Example 1.

EXAMPLE 3

The reactants and conditions of Example 2 were repeated using the prior art catalyst imidazole. The product mixture obtained partially melted at 108° C.–112° C. and completely melted at 120° C.–135° C., indicating the presence of higher oligomers. Analysis by nuclear magnetic resonance spectroscopy indicated a bis(2-hydroxyethyl)terephthalate yield of only 12 percent.

Comparison of liquid chromatograms of the crude product obtained with liquid chromatograms of the crude product in Examples 1 and 2 indicated that using 4-(N,N-dimethylamino)pyridine as the catalyst gave good selectivity to bis(2-hydroxyethyl)terephthalate production whereas using imidazole gave bis(2-hydroxyethyl)terephthalate as a minor component of a complex mixture of higher oligomers.

Further comparison of liquid chromatograms of the products obtained after extraction and washing steps showed that substantially pure bis(2-hydroxyethyl)terephthalate was obtained using 4-(N,N-dimethylamino)pyridine as the catalyst but, that higher oligomers that were difficult to separate by simple purification procedures still contaminated the bis(2-hydroxyethyl)terephthalate produced using imidazole as the catalyst.

EXAMPLE 4

Terephthalic acid and ethylene carbonate in molar ratio of 1:4 comprising 16.61 g terephthalic acid and 35.24 g ethylene carbonate together with 1.0 percent (except where indicated otherwise) by weight based on terephthalic acid of one of the catalysts described in more detail below, were treated according to the reaction conditions of Example 2. The time required to produce known amounts of $CO_2$ is taken as a measurement of the effectiveness of the catalyst. Table I shows the results of the experiments.

TABLE I

| Catalyst | Approximate time required to produce indicated amount of $CO_2$ (min) | | | |
|---|---|---|---|---|
| | 1 liter | 2 liters | 3 liters | 4 liters |
| pyridine | 18 | 25 | 32 | 38 |
| 4-(N,N—dimethyl-amino)pyridine | 20 | 27 | 36 | 41 |
| 2,5-dimethyl-pyridine | 21 | 32 | 43 | 54 |
| 2-amino-6-picoline | 39 | 74 | 108 | 143 |
| 2-amino-pyridine | 22 | 34 | 46 | 59 |
| 3-(pyrrol-1-ylmethyl)-pyridine | 21 | 29 | 37 | 46 |
| methyl-pyrazine | 30 | 54 | 78 | 108 |
| amino-pyrazine | 19 | 26 | 33 | 41 |
| pyrrolo[1,2-a]-quinoxaline | 33 | 47 | 62 | 76 |
| 2-amino-pyrimidine | 44 | 71 | 98 | 128 |
| Quinoline (1.34 wt. %) | 23 | 33 | 44 | 55 |
| No catalyst | 164 | 330 | 496 | 662 |

EXAMPLE 5—Linear Polyester

A 200 ml glass resin flask equipped with a spiral glass agitator and stirring motor was charged with terephthalic acid (49.84 g, 0.30 mole), ethylene carbonate (29.07 g, 0.33 mole) and 4-(N,N-dimethylamino)pyridine (0.0058 g, 0.012 percent based on terephthalic acid reactant weight). The flask and contents were purged with dry nitrogen for about 30 minutes and then immersed in a 260° C. stirred oil bath.

After the ethylene carbonate melted, stirring was commenced and continued for about 2 hours under the nitrogen blanket until the mixture foamed only slightly and was nearly clear. Then zinc acetate (0.029 g, 0.058 percent based on terephthalic acid reactant weight) was added followed by 2 ml of ethylene glycol rinse to insure catalyst contact with the reactants. Pressure was reduced to about 1-2 mm Hg over a period of from 5 to 10 minutes and the bath temperature was raised gradually to 288° C. over about 30 minutes.

The melt was stirred at gradually slower speeds at a temperature of about 288° C. and under about 0.5 to 1 mm Hg pressure for an additional 75 minutes. A very clear, viscous melt was obtained that solidified upon cooling.

After solidification, a shiny, slightly off-white solid was obtained having inherent viscosity of 0.69 as measured in a 0.5 percent solution in 50:50 phenol: sym-tetrachloroethane at 25° C. The product had a melting point of 255° C. as determined by differential scanning calorimetry. Acid number (mg KOH/g) as determined by the method of A. Conix, Macromol. Chem., 26, 226 (1958) was 2.2. Diethylene glycol content (mole percent) as determined by the method of D. R. Goskill et al., Anal. Chem., 39, 106 (1967) was 0.85.

EXAMPLE 6

The reaction conditions of Example 5 were repeated except that no zinc acetate polycondensation catalyst was added prior to the polycondensation step. After reaction for the same amount of time as in Example 5 the product was again solidified. Analysis showed a product having inherent viscosity of 0.29, an Acid number of 6.8 mg KOH/g, and a diethylene glycol content of 0.6 percent as measured according to the procedures of Example 5.

EXAMPLE 7

The reaction conditions of Example 5 were again repeated except that zinc acetate (0.03 g) was added in combination with 4-(N,N-dimethylamino)pyridine prior to the first step of the reaction. Subsequent analysis of the product gave an inherent viscosity of 0.48, an Acid number of 6.8 mg KOH/g, and a diethylene glycol content of 0.7 percent as measured according to the procedures of Example 5.

I claim:

1. A process for producing a bis(2-hydroxy-alkyl)ester of an aromatic dicarboxylic acid comprising reacting by contacting an aromatic dicarboxylic acid with a cyclic alkylene carbonate in a molar ratio of dicarboxylic acid to cyclic alkylene carbonate of from about 1:2 to about 1:20 at a temperature from about 145° C. to about 200° C. in the presence of a catalytic amount of an organic compound containing at least one six-membered aromatic nitrogen-containing heterocyclic moiety selected from the group consisting of

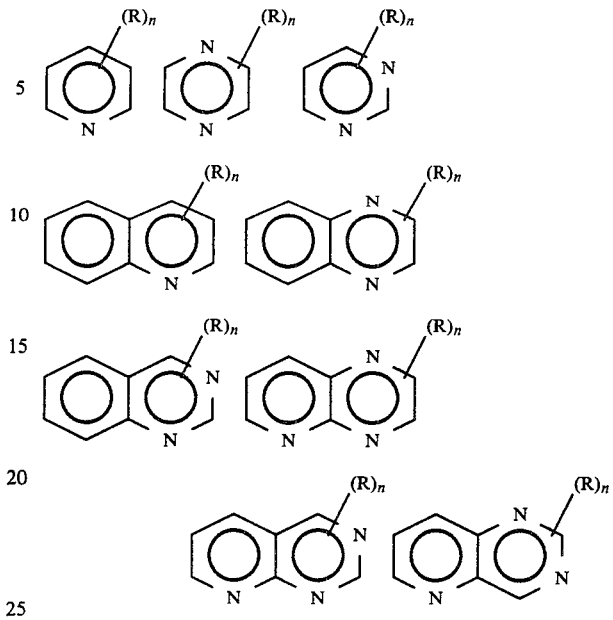

wherein R is amino, phenyl, or a radical containing up to 4 carbons selected from alkyl, alkylamino, dialkylamino and oxyalkyl; and n is zero, one or two and recovering the bis(2-hydroxyalkyl)ester produced.

2. The process according to claim 1 wherein said catalyst is selected from a group consisting of pyridine and pyridine further substituted with one or two substituents selected from amino, phenyl and a radical containing up to 4 carbons selected from alkyl, alkylamino, dialkylamino and oxyalkyl.

3. The process according to claim 2 wherein said catalyst is 4-(N,N-dimethylamino)pyridine.

4. The process according to claim 2 wherein said catalyst is a dialkyl pyridine.

5. The process according to claim 4 wherein said catalyst is 3,5-dimethylpyridine.

6. The process according to claim 1 wherein said catalyst is quinoline.

7. The process according to claim 1 wherein said aromatic dicarboxylic acid is terephthalic acid and said cyclic glycol carbonate is ethylene carbonate.

8. The process according to claim 1 wherein the reaction products are obtained by cooling to less than about 130° C. sufficiently soon after substantial completion of the reaction to avoid formation of substantial amounts of higher oligomers.

9. The process according to claim 7, 1 or 8 wherein crude terephthalic acid is employed and in addition impurities and color bodies are removed from the bis(2-hydroxyalkyl)ester formed by a purification process.

10. The process according to claim 1 or 8 wherein the product is recovered by extracting with an inert organic solvent.

11. The process according to claim 10 wherein crude terephthalic acid is employed and in addition impurities and color bodies are removed from the bis(2-hydroxyalkyl)ester formed by a purification process.

* * * * *